US009308471B2

(12) United States Patent
Poulter et al.

(10) Patent No.: US 9,308,471 B2
(45) Date of Patent: Apr. 12, 2016

(54) RE-ENTRAINMENT PREVENTION APPARATUS

(75) Inventors: Scott Brian Poulter, Birkdale (AU); Ross Jeffrey Haywood, Cashmere (AU); Wesley Adam Taylor, Warner (AU); Christos Panaou, Wellington Point (AU)

(73) Assignee: Hatch Associates Pty Ltd, Western Australia (AU)

( * ) Notice: Subject to any disclaimer, the term of this patent is extended or adjusted under 35 U.S.C. 154(b) by 255 days.

(21) Appl. No.: 14/111,843

(22) PCT Filed: Apr. 11, 2012

(86) PCT No.: PCT/AU2012/000363
§ 371 (c)(1),
(2), (4) Date: Dec. 17, 2013

(87) PCT Pub. No.: WO2012/142649
PCT Pub. Date: Oct. 26, 2012

(65) Prior Publication Data
US 2014/0138327 A1    May 22, 2014

(30) Foreign Application Priority Data

Apr. 20, 2011   (AU) ................. 2011901486

(51) Int. Cl.
B01D 11/00    (2006.01)
B01D 17/028   (2006.01)
B01D 11/04    (2006.01)
B01D 21/00    (2006.01)
(Continued)

(52) U.S. Cl.
CPC ........ *B01D 11/0449* (2013.01); *B01D 11/0453* (2013.01); *B01D 17/0211* (2013.01); *B01D 21/0033* (2013.01); *B01D 21/0042* (2013.01); *B01D 21/2416* (2013.01); *C22B 3/0005* (2013.01); *Y02P 10/234* (2015.11)

(58) Field of Classification Search
CPC .......... B01D 11/0449; B01D 11/0453; B01D 17/0208; B01D 17/0211; B01D 21/0033; B01D 21/0042; B01D 21/2405; B01D 21/2416
USPC ............... 210/800, 519, 521, 532.1, 538, 540
See application file for complete search history.

(56) References Cited

U.S. PATENT DOCUMENTS 1,902,171 A * 3/1933 Kopp ..................... C02F 3/28
                                                    210/538
3,419,145 A * 12/1968 De Celis ............ B01D 17/0211
                                                    210/261

(Continued)

OTHER PUBLICATIONS

International Search Report and Written Opinion for PCT/AU2012/000363, mailed Jun. 6, 2012; ISA/AU.

*Primary Examiner* — Christopher Upton
(74) *Attorney, Agent, or Firm* — Harness, Dickey & Pierce, P.L.C.

(57) ABSTRACT

A re-entrainment prevention apparatus (18) for use in a settler area (12) of a mixer-settler, the re-entrainment prevention apparatus (18) comprising: at least one panel (28, 30) of generally vertical linearly-spaced barrier elements (31), an upper barrier element (24) and a lower barrier element (26), wherein the upper and lower barrier elements (24, 26) are arranged relative to the generally vertical barrier elements (31) so as to constrain a fluid flow (32) that impinges thereon such that it is directed through fluid flow channels defined between the generally vertical linearly-spaced barrier elements (31).

19 Claims, 2 Drawing Sheets

(51) Int. Cl.
    *B01D 17/02*   (2006.01)
    *B01D 21/24*   (2006.01)
    *C22B 3/26*    (2006.01)

(56) References Cited

U.S. PATENT DOCUMENTS

| | | | | |
|---|---|---|---|---|
| 4,064,054 A * | 12/1977 | Anderson | .......... | B01D 17/0211 |
| | | | | 210/521 |
| 4,157,969 A * | 6/1979 | Thies | .......... | B01D 17/0208 |
| | | | | 210/521 |
| 4,717,481 A | 1/1988 | Staehle et al. | | |
| 5,266,191 A * | 11/1993 | Greene | .......... | B01D 21/0039 |
| | | | | 210/519 |
| 5,620,600 A * | 4/1997 | Smati | .......... | B01D 21/2405 |
| | | | | 210/519 |
| 5,830,355 A * | 11/1998 | Harris | .......... | B01D 21/02 |
| | | | | 210/519 |
| 6,827,865 B1 | 12/2004 | Fenwick | | |
| 7,384,551 B2 * | 6/2008 | Giralico | .......... | B01D 17/045 |
| | | | | 210/519 |
| 7,717,275 B2 * | 5/2010 | Gerges | .......... | B01D 21/0045 |
| | | | | 210/519 |
| 7,731,853 B2 * | 6/2010 | Ekman | .......... | B01D 11/0446 |
| | | | | 210/519 |

\* cited by examiner

RE-ENTRAINMENT PREVENTION APPARATUS

CROSS-REFERENCE TO RELATED APPLICATIONS

This application is a 371 U.S. National Stage of International Application No. PCT/AU2012/000363, filed on Apr. 11, 2012, and claims priority to Australian Patent Application No. 2011901486, filed on Apr. 20, 2011 the disclosures of which are herein incorporated by reference in their entirety.

TECHNICAL FIELD

The present invention relates to a re-entrainment prevention apparatus. More particularly, the re-entrainment prevention apparatus of the present invention is intended for use in solvent extraction and partitioning. Further, this invention relates to a settler feed arrangement for preventing re-entrainment of dispersion feeds in a settler area or tank of a solvent extraction plant, and to a method of preventing re-entrainment of dispersion feeds in a settler area or tank of a solvent extraction plant.

BACKGROUND ART

Liquid-liquid extraction, also referred to as solvent extraction or partitioning, is a method used in hydrometallurgy to separate or extract compounds from one liquid phase into another liquid phase. This is accomplished by manipulating the relative solubilities of the compounds to be isolated in two or more liquids having differing characteristics, as is the case with an aqueous phase (such as water), and an organic solvent phase (such as an oil or immiscible organic solvent).

The term 'solvent extraction' can also refer to the separation of a substance from a mixture by preferentially dissolving that substance in a suitable solvent. In such a case, a soluble compound may be separated from an insoluble compound or a complex matrix.

Although the term 'partitioning' is sometimes used to refer to the underlying chemical and physical processes involved in liquid-liquid extraction, these terms as used herein may be considered synonymous.

In the field of solvent extraction, several hydrometallurgical systems have in the past been developed which incorporate systems for manipulating liquid flow streams and phases, and for separating, splitting, or isolating liquids or phases of liquids, and the desired compounds extracted by such systems. Typically, a mixture of an extractant in a diluent is used to extract a desired compound from one phase to another. In solvent extraction techniques this mixture is often referred to as the organic phase and entrained organics need to be removed or recovered from the eventual aqueous streams.

Many extraction processes make use of so-called mixer-settlers. Mixer-settlers are a type of mineral process equipment used in solvent extraction processes and which consist of a first stage that mixes the phases together in an agitated tank (referred to as a mixer) followed by a quiescent settling stage, usually in the form of a gravity settling basin or tank (settler) that allows the phases to separate by gravity. It is difficult to manage the flow of liquid in settlers to achieve sufficient separation of the various liquid phases and to minimise the settler area that is required to effect separation of the phases. The flow of liquids needs to be as laminar as possible, as flow interruptions or turbulence can lead to co-mixing of phases and resultant losses in extraction efficiency. The settling stage allows the phases to separate, but achieving high flow rates can disturb the flow and hamper the process of separation, making it inefficient. Such systems are analysed using so-called CFD (computational fluid dynamics) modelling.

In conventional systems of which the Applicant is aware, adequately sized and positioned feed distribution baffles are positioned in the feed streams in the settler area in an attempt to effect an even flow, but these systems do not produce a suitably even distribution of fluids at higher velocities. A common problem with such baffles is that they are highly susceptible to scaling, leading to significant down-time and process interruption for cleaning or replacement of baffle elements. Other systems that the Applicant is aware of include fixed obstacles or deflector plates placed within the settler area but these systems have significant drawbacks in terms of settler kinetics and flow dynamics. So-called split launders and variable-split launders have also been used in certain systems, but these are also of little value in ensuring smooth fluid flow and dispersion distribution.

There exists a need for a settler dispersion distribution array which addresses some of the shortcomings of the prior art.

The preceding discussion of the background art is intended to facilitate an understanding of the present invention only. The discussion is not an acknowledgement nor admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers. The term "linearly spaced" or derivatives thereof are to be understood to refer to the spacing apart of two or more items along their length so as to create a 'line' of those items.

The term "re-entrainment prevention apparatus" or variations thereof will be understood to refer to a feed distribution array provided in a form so as to accord with the present invention. That is, the "re-entrainment prevention apparatus" of the present invention is a form of feed distribution array. Additionally however, the "re-entrainment prevention apparatus" of the present invention also incorporates therein a portion thereof that is accurately defined as a feed distribution array. The specifics of this arrangement will be described hereinafter.

SUMMARY OF INVENTION

In accordance with the present invention there is provided a re-entrainment prevention apparatus for use in a settler area of a mixer-settler, the re-entrainment prevention apparatus comprising:

at least one panel of generally vertical linearly-spaced barrier elements, an upper barrier element and a lower barrier element, wherein the upper and lower barrier elements are arranged relative to the generally vertical barrier elements so as to constrain a fluid flow that impinges thereon such that it is directed through fluid flow channels defined between the generally vertical linearly-spaced barrier elements.

Preferably, the linearly-spaced barrier elements extend between the upper and lower barrier elements.

Still preferably, the re-entrainment prevention apparatus is proportioned so as to extend across the width of a settler area or tank. Further, the re-entrainment prevention apparatus extends to a height within the settler area or tank such that the fluid flow therein does not pass over same.

In one form of the present invention the fluid flow channels defined by the panel are arranged such that the constrained fluid flow is able to pass therethrough does so at a level in the settler area or tank that is generally intermediate relative to the level of fluid within that settler area or tank.

Preferably, a mid-point between the upper and lower barrier elements is positioned at an organic/aqueous interface.

In accordance with the present invention there is further provided a method for limiting recirculation flows in a settler area or tank of a mixer-settler, the method comprising the method step of:

directing an upstream fluid flow in a settler area or tank to a re-entrainment prevention apparatus as defined hereinabove, whereby the fluid flow therethrough is constrained such that the constrained fluid flow passes the apparatus at a level in the settler area or tank that is generally intermediate relative to the level of fluid within that settler area or tank.

Preferably, the upstream fluid flow is in the form of a dispersion of organic and aqueous phases.

Still preferably, a downstream fluid flow after the re-entrainment prevention apparatus is such that it is substantially defined as independent organic and aqueous layers, in between which is provided a dispersion layer.

The method of the present invention allows the dispersion to advance into the next portion of the settler at the optimum level in accordance with the specific gravity of the mixture, thereby preventing or limiting the vertical component of flow typically generated at this picket fence interface. This vertical component of flow is typically observed at the surface of the fluid flow as it cascades through a feed distribution arrangement and occurs below the surface as dispersion rises rapidly upon entering a separated aqueous phase. Re-entrainment prevention is achieved by closing off the top and bottom of the re-entrainment prevention apparatus and allowing the dispersion only to flow through the distribution arrangement at a desired level.

Further aspects of the invention will now be described with reference to the following non-limiting examples and drawings.

BRIEF DESCRIPTION OF THE DRAWINGS

The present invention will now be described, by way of example only, with reference to one embodiment thereof and the accompanying drawings, in which.

DESCRIPTION OF EMBODIMENTS

The Applicant has investigated the transverse nature of flow patterns in settler and launder systems and identified and analysed pressure gradients which typically develop in conventional feed systems. CFD was the principal tool utilised to evaluate feed distribution systems, while quantitative distribution measurement was utilised to rank each system that was tested.

Generally, the re-entrainment prevention apparatus and method as described herein defines flow channels or slots for feed fluids to flow through. The channels are defined by barrier elements so that the channels are longer than they are wide. This greatly reduces any transverse flow:

The re-entrainment prevention apparatus of the present invention comprises in part a feed distribution array in which the flow channels or slots for feed fluids are provided. The channels are defined by barrier elements provided as panels of such barrier elements, wherein the width of the fluid flow channels between the barrier elements is narrower than the fluid flow channel is deep, relative to a length of the settler area in which the panel is to be positioned or is located. This greatly reduces any transverse fluid flow in the settler area subsequent to the distribution array.

It was found that variation in the spacing between the panels of barrier elements that extend across the width of the settler leads to an equalisation of the pressure differential generated by the mixer-settler geometry (that is, conventional, side feed, reverse flow geometries, and the like). During the evaluation of existing systems, CFD was the principal tool utilised to review and analyse feed distribution systems. Specifically, quantitative distribution measurement was utilised to rank each of the various systems analysed and to provide quantitative data. The Applicant, following the evaluations, found surprisingly, that obstacles to guide the flow of streams to be separated were of little value in ensuring smooth flow. Specifically, the Applicant found that so-called split launder systems or systems using traditional baffles were of little value.

Further to the above, the feed distribution array additionally has provided therein upper and lower barrier elements that extend substantially horizontally along the feed distribution array and prevent fluid flow from passing through the array other than in the area defined between the upper and lower barrier elements. As such, the fluid flow is constrained by the upper and lower barrier elements, thereby limiting the vertical component of flow, and is also constrained by the generally vertical barrier elements of the or each panel of the feed distribution array to flow through channels defined therebetween.

Figure 1:
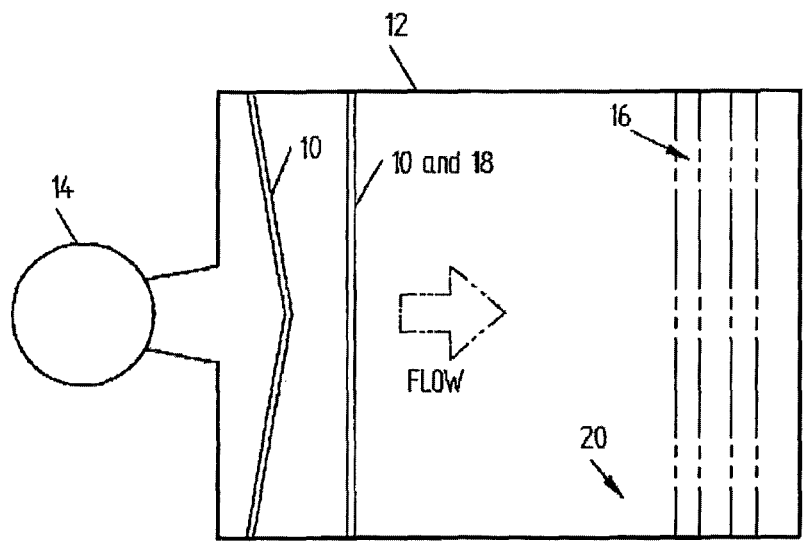
FIG. 1 is a top plan view of a mixer-settler, in the settler tank of which is provided a re-entrainment prevention apparatus in accordance with the present invention.

In FIG. 1 there are shown two distribution arrays 10 provided in, and extending laterally across the width of, a settler area or tank 12. A mixer tank 14 is provided adjacent to the settler tank 12 and is arranged to direct fluid therefrom into the settler tank 12. The settler tank 12 has provided therein a number of discharge launders 16 positioned remotely from the settler tank 12 and distribution arrays 10, providing an area in which settling may take place. One of the distribution arrays 10 is adapted to form a portion of a re-entrainment prevention apparatus 18 in accordance with the present invention.

Figure 2:
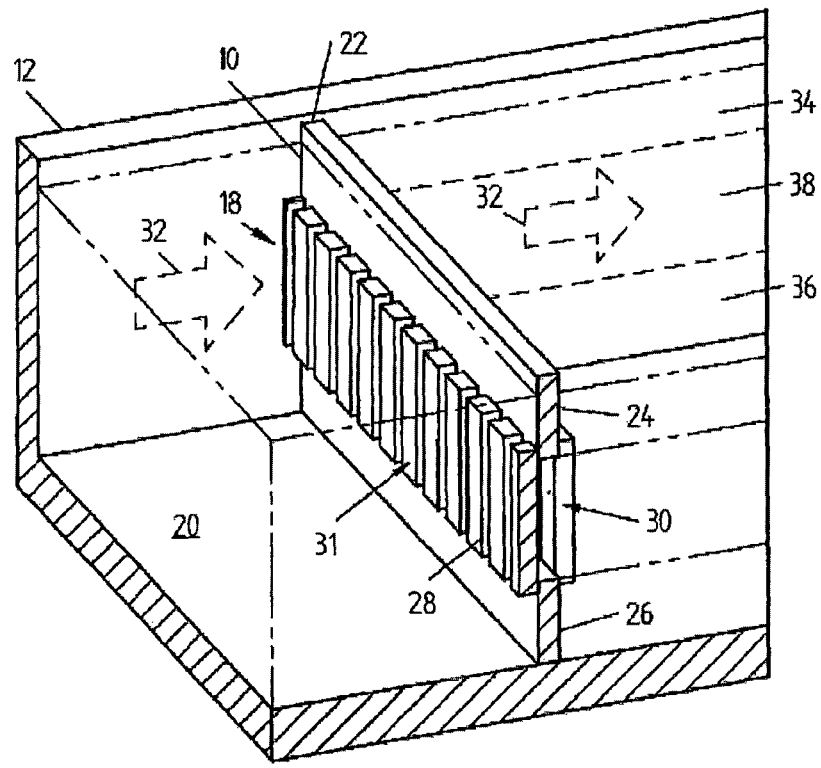
FIG. 2 is an upper perspective view of the re-entrainment prevention apparatus of FIG. 1, shown in position within the settler tank.
Figure 3:
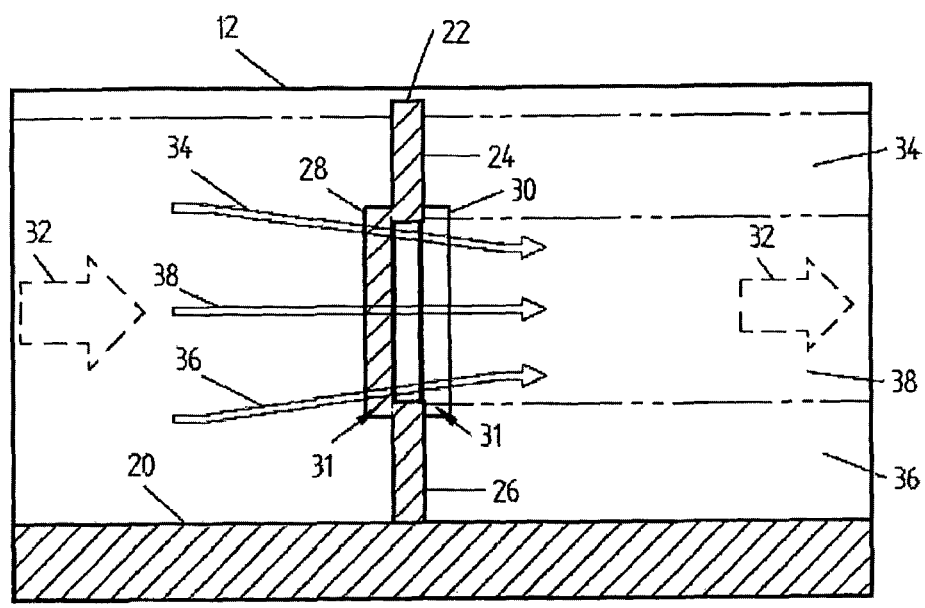
FIG. 3 is a side sectional view of the re-entrainment prevention apparatus of FIG. 1, again shown in position within the settler tank.

In FIGS. 2 and 3 there is shown the re-entrainment prevention apparatus 18 in greater detail. The re-entrainment prevention apparatus 18 extends from a base 20 of the settler tank 14 upwardly to a point 22 above the fluid level therein. The re-entrainment prevention device 18 comprises a distribution array 10, as noted above, and further comprises an upper barrier element 24 and a lower barrier element 26.

Each distribution array 10 comprises an upstream panel 28 and a downstream panel 30. Each panel 28 and 30 is comprised of a plurality of substantially upright barrier elements 31 which are arranged so as to be substantially parallel with respect to their laterally adjacent barrier elements. Each barrier element 31 of the panels 28 and 30 is generally rectangular in top section, as can best be seen with reference to FIG. 2. Further, the channels defined between adjacent upright barrier elements 31 are narrower than they are deep, relative to the direction of the fluid flow within the settler tank 12. It is to be understood that each barrier element 31 may also be provided such that in top section it appears U- or C-shaped, being an open-backed rectangle presenting its closed face to the on-coming fluid flow in the settler tank 14.

The upper barrier element 24 and lower barrier element 26 constrain fluid flow impinging thereon at the top and bottom of the settler tank 12, forcing fluid flow to occur at a generally mid or intermediate level in the tank 12 and through the or each distribution array 10.

As noted hereinbefore, a fluid stream 32 emanating from the upstream mixer 14 is directed into the settler tank 12 to flow therethrough and to facilitate settling to occur therein. With specific reference to FIGS. 2 and 3, upstream flow encounters an upstream panel 28 of the feed distribution array 10 and is caused to flow through flow channels formed between the adjacent substantially vertical barrier elements forming the panel 28. In this particular embodiment in which there is a provided a downstream panel 30 also, the flow is then caused to move laterally within the settler tank 12 as it encounters the barrier elements of the downstream panel, the barrier elements of which are offset laterally with respect to the substantially vertical barrier elements thereof. The flow moves laterally to the point at which it is able to pass through a downstream flow channel and pass into the downstream portion of the settler tank 12.

The flow of the fluid stream 32 is constrained also at the top and bottom of the settler tank 12 by way of the upper barrier element 24 and the lower barrier element 26. In this manner the components of the fluid stream 32, being an upper organic, layer 34, a lower aqueous layer 36 and an intermediate dispersion layer 38 are caused to flow between the barrier elements of the panels 28 and 30, as best seen in FIG. 3. This arrangement limits recirculation flows typically observed, often in the organic phase, in settler tanks of the prior art that may be provided with some form of flow dispersion means. Such recirculation flows traditionally increase the overall velocity of the fluid flow and result in undesired entrainment and poor phase separation.

The depth of the barrier elements 24 and 26 of each distribution array 10, relative to a length of the settler tank 12 in which it is positioned, is smaller than the transverse width thereof. This arrangement has been found by the Applicant to balance flow distribution across the width of the settler tank 12. The number of distribution arrays 10 may be varied to suit specific applications. However, providing two distribution arrays 10 with re-entrainment prevention apparatus 18 therein, as described herein, has been found by the Applicant to achieve substantially even distribution of fluid across the full width of the settler tank 12 with little dynamic head loss.

In one example, for a total liquid depth of 1300 mm in the settler tank 12, being 600 mm organic and 700 mm aqueous, the wetted section of upper barrier element 24 is 300 mm high. There is then provided a 600 mm opening with the lower barrier element 26, which is 400 mm high, extending to the base 20 of the settler tank 12. As described hereinabove, the mid-point of the opening between the barrier elements 24 and 26 is positioned at the organic/aqueous interface.

It is envisaged that the re-entrainment prevention apparatus and method of the present invention may be utilised to increase the throughput and/or reduce entrainment losses of existing solvent extraction facilities to which it may, in certain instances, be retrofitted. The present invention may be utilised to reduce the settler area required in solvent extraction plants and reduce entrainment in new facilities.

It is envisaged that the distribution array of the re-entrainment prevention apparatus may comprise only a single panel of generally vertical barrier elements. Further, it is envisaged that the re-entrainment prevention apparatus may comprise only a single panel of generally vertical barrier elements in addition to the upper and lower barrier elements 24 and 26.

It is further envisaged that the re-entrainment prevention apparatus of the present invention may be retrofitted to existing settler-mixers. Still further, it is envisaged that the upper and lower barrier elements of the present invention may be installed on feed distribution baffles or plates of the prior art to create a re-entrainment apparatus that falls within the scope of the present invention.

Modifications and variations such as would be apparent to the skilled addressee are considered to fall within the scope of the present invention.

The invention claimed is:

1. A re-entrainment prevention apparatus for use in a settler tank that receives fluid from a mixer tank, the re-entrainment prevention apparatus comprising:
   at least one panel of generally vertical linearly-spaced barrier elements, an upper barrier element and a lower barrier element, wherein the upper and lower barrier elements are arranged relative to the generally vertical barrier elements so as to constrain a fluid flow that impinges thereon such that it is directed through fluid flow channels defined between the generally vertical linearly-spaced barrier elements, wherein the lower barrier element is configured to extend to a bottom of the settler tank to prevent fluid flow between the lower barrier element and the bottom of the settler tank, and wherein the fluid flow channels are configured to extend through a midpoint of a height of the settler tank.

2. The apparatus according to claim 1, wherein the linearly-spaced barrier elements extend between the upper and lower barrier elements.

3. The apparatus according to claim 1, wherein the re-entrainment prevention apparatus is proportioned so as to extend across the width of the settler tank.

4. The apparatus according to claim 3, wherein the apparatus extends to a height within the settler tank such that the fluid flow therein does not pass over same.

5. The apparatus according to claim 3, wherein the fluid flow channels defined by the panel are arranged such that the constrained fluid flow able to pass therethrough does so at a level in the settler tank that is generally intermediate relative to the level of fluid within that settler area or tank.

6. The apparatus according to any one of the preceding claims, wherein an organic/aqueous interface of the constrained fluid flow passes through the panel at a midpoint between the upper and lower barrier elements.

7. A method for limiting recirculation flows in a settler area or tank of a mixer-settler, the method comprising the method step of:
   directing all of an upstream fluid flow in a settler area or tank to a re-entrainment prevention apparatus as defined in claim 1, whereby the fluid flow therethrough is constrained such that the constrained fluid flow passes the apparatus at a level in the settler area or tank that is generally intermediate relative to the level of fluid within that settler area or tank.

8. The method according to claim 7, wherein the upstream fluid flow is in the form of a dispersion of organic and aqueous phases.

9. The method according to claim 8, wherein the dispersion advances into the next portion of the settler at the optimum level in accordance with the specific gravity of the mixture, thereby preventing or limiting a vertical component of flow typically generated at this picket fence interface, such vertical component of flow typically being observed at the surface of the fluid flow as it cascades through a feed distribution arrangement and occurs below the surface as dispersion rises rapidly upon entering a separated aqueous phase.

10. The method according to claim 7, wherein a downstream fluid flow after the re-entrainment prevention apparatus is such that it is substantially defined as independent organic and aqueous layers, in between which is provided a dispersion layer.

11. The method according to claim 7, wherein re-entrainment prevention is achieved by closing off the top and bottom of the re-entrainment prevention apparatus and allowing the dispersion only to flow therethrough at a desired level.

12. The apparatus according to claim 1, wherein the fluid flow channels have a width that is less than their respective depths.

13. The apparatus according to claim 1, wherein the at least one panel of generally vertical linearly-spaced barrier elements includes an upstream panel of generally vertical linearly-spaced barrier elements disposed upstream of the upper and lower barrier elements and a downstream panel of generally vertical linearly-spaced barrier elements disposed downstream of the upper and lower barrier elements.

14. The apparatus according to claim 13, wherein the generally vertical linearly-spaced barrier elements of the upstream and downstream panels are laterally offset relative to one another.

15. The apparatus according to claim 13, wherein the generally vertical linearly-spaced barrier elements of the upstream and downstream panels abut the upper and lower barrier elements.

16. The apparatus according to claim 1, wherein the at least one panel of generally vertical linearly-spaced barrier elements includes an upstream panel of generally vertical linearly-spaced barrier elements that abut an upstream surface of the upper and lower barrier elements.

17. The apparatus according to claim 16, wherein the at least one panel of generally vertical linearly-spaced barrier elements includes a downstream panel of generally vertical linearly-spaced barrier elements that abut a downstream surface of the upper and lower barrier elements.

18. A method for preventing re-entrainment in a settler area or tank of a mixer-settler, the method comprising:
    forming fluid flow channels in the settler area or tank using at least one panel of generally vertical barrier elements; and
    using upper and lower barrier elements, constraining all fluid flow in the settler area or tank to pass through the fluid flow channels at a level in the settler area or tank that is generally intermediate relative to a level of fluid within the settler area or tank.

19. The method of claim 18, further comprising constraining fluid flow in the settler area or tank such that an organic/aqueous interface of the constrained fluid flow is positioned at a midpoint of an opening between the upper and lower barrier elements.

* * * * *